US009248746B2

(12) United States Patent
Wen (10) Patent No.: US 9,248,746 B2
(45) Date of Patent: Feb. 2, 2016

(54) ABNORMAL BATTERY DETECTING SYSTEM AND ABNORMAL BATTERY DETECTING METHOD FOR BATTERY MODULE

(71) Applicant: Aleees Eco Ark Co. Ltd., Taoyuan County (TW)

(72) Inventor: Chung-Wei Wen, Taoyuan County (TW)

(73) Assignee: ALEEES ECO ARK CO., LTD., Taoyuan county (TW)

( * ) Notice: Subject to any disclaimer, the term of this patent is extended or adjusted under 35 U.S.C. 154(b) by 0 days.

(21) Appl. No.: 14/356,560

(22) PCT Filed: Nov. 7, 2012

(86) PCT No.: PCT/CN2012/084208
§ 371 (c)(1),
(2) Date: May 6, 2014

(87) PCT Pub. No.: WO2013/067930
PCT Pub. Date: May 16, 2013

(65) Prior Publication Data
US 2014/0324262 A1 Oct. 30, 2014

Related U.S. Application Data

(60) Provisional application No. 61/556,386, filed on Nov. 7, 2011.

(51) Int. Cl.
*B60L 11/18* (2006.01)
*B60L 3/12* (2006.01)
(Continued)

(52) U.S. Cl.
CPC .............. *B60L 3/12* (2013.01); *B60L 3/0046* (2013.01); *B60L 3/0069* (2013.01); *B60L 3/04* (2013.01);
(Continued)

(58) Field of Classification Search
USPC .......... 701/1, 22, 36, 45, 49, 29.1, 29.2, 31.6, 701/31.7; 340/425.5, 438, 439, 449, 455, 340/459, 461; 307/9.1, 10.1, 10.7; 180/271, 180/279, 65.1, 65.29
See application file for complete search history.

(56) References Cited

U.S. PATENT DOCUMENTS 5,565,711 A * 10/1996 Hagiwara .................... 307/10.1
6,599,656 B2 * 7/2003 Cittanova ....................... 429/61
(Continued)

FOREIGN PATENT DOCUMENTS

CN 102064364 5/2011
JP 11-219732 8/1999
(Continued)

*Primary Examiner* — Thomas Tarcza
*Assistant Examiner* — Edward Pipala
(74) *Attorney, Agent, or Firm* — Kirton McConkie; Evan R. Witt (57) ABSTRACT

An abnormal battery detecting system for an electric vehicle includes a power supply unit, a displaying unit, a battery module, a safety protection unit, a detecting unit, and a controlling unit. The battery module a main power source of the electric vehicle. The safety protection unit is connected with the battery module and the power supply unit. The detecting unit is connected with the battery module and the power supply unit for detecting the battery module. If the battery module is abnormal, the detecting unit generates at least one feedback signal that is received by the controlling unit. The controlling unit compares the feedback signal with at least one preset default value and generates an abnormal level signal to the displaying unit and the safety protection unit. The safety protection unit is selectively enabled to control an operation of the battery module according to the abnormal level signal.

29 Claims, 5 Drawing Sheets (51) Int. Cl.
  *B60L 3/00* (2006.01)
  *H01M 10/42* (2006.01)
  *H01M 10/48* (2006.01)
  *B60L 3/04* (2006.01)
  *H02J 7/00* (2006.01)

(52) U.S. Cl.
  CPC .......... *H01M 10/425* (2013.01); *H01M 10/488* (2013.01); *H02J 7/0029* (2013.01); *B60L 2240/545* (2013.01); *B60L 2250/10* (2013.01); *B60L 2250/16* (2013.01); *H01M 2010/4278* (2013.01); *H01M 2220/20* (2013.01); *H02J 7/0042* (2013.01)

(56) References Cited

U.S. PATENT DOCUMENTS

| | | | |
|---|---|---|---|
| 6,873,135 B2 | 3/2005 | Nakatsuji | |
| 7,339,774 B2 * | 3/2008 | Zdziech et al. | 361/93.1 |
| 7,511,456 B2 * | 3/2009 | Lee et al. | 320/116 |
| 7,521,817 B2 * | 4/2009 | Gors | 307/10.1 |
| 8,761,979 B2 * | 6/2014 | Yun | 701/22 |
| 8,846,232 B2 * | 9/2014 | Tse | 429/120 |
| 8,884,459 B2 * | 11/2014 | Smith et al. | 307/9.1 |

FOREIGN PATENT DOCUMENTS

| | | |
|---|---|---|
| JP | 11219732 | 8/1999 |
| JP | 2001-102092 | 4/2001 |
| JP | 2001102092 | 4/2001 |
| JP | 2002-289262 | 10/2002 |
| JP | 2002289262 | 10/2002 |
| JP | 2004-146307 | 5/2004 |
| JP | 2004146307 | 5/2004 |
| JP | 2007-200880 | 8/2007 |
| JP | 2007200880 | 8/2007 |
| JP | 2008-535174 | 8/2008 |
| JP | 2008535174 | 8/2008 |
| JP | 2010-153117 | 7/2010 |
| JP | 2010153117 | 7/2010 |
| JP | 4517397 | 8/2010 |
| TW | I311109 | 6/2009 |
| TW | I311109 | 6/2009 |
| WO | 2009/011749 | 1/2009 |
| WO | 2009011749 | 1/2009 |

* cited by examiner

ABNORMAL BATTERY DETECTING SYSTEM AND ABNORMAL BATTERY DETECTING METHOD FOR BATTERY MODULE

FIELD OF THE INVENTION

The present invention relates to an abnormal battery detecting system and an abnormal battery detecting method for a battery module, and more particularly to an abnormal battery detecting system and an abnormal battery detecting method for a battery module of an electric vehicle.

BACKGROUND OF THE INVENTION

Recently, since the global warming problems become more serious, many countries start the carbon reduction policies. In the current environment, the carbon dioxide emission from transportation vehicles is about a quarter of the total carbon dioxide emission. As known, most of the current transportation vehicles are driven by internal combustion engines. The transportation vehicles that are driven the by internal combustion engines will be gradually replaced by electric vehicles.

The electric vehicle is one of the representative products in the green energy industries. However, the use of the electric vehicle still has some drawbacks. For example, during the process of driving the electric vehicle, a battery module of the electric vehicle is possibly subjected to spontaneous combustion. Since the battery module is fixed in a vehicle body of the electric vehicle, if the battery module is abnormal or subjected to spontaneous combustion, the use of a fire extinguisher is the only way to reduce the injury and loss. If a fire accident occurs, the driver may only extinguish the fire in the effective inner space of the electric vehicle, but cannot get rid of the hazardous factors. Moreover, if the fire cannot be completely extinguished by the fire extinguishing system, the residual fire may broaden the disaster and endanger the safety of the passengers. Due to the above drawbacks, the electric vehicle cannot be trusted by many people. Generally, the spontaneous combustion is caused by the battery module. During the discharging process, the battery module certainly generates heat. In addition, during the process of driving the electric vehicle, the battery module may be abnormally discharged or short-circuited because of many factors. Although the manufacturers continuously make efforts in improvement of the battery module or the constituents, the phenomenon of generating heat in the battery discharging process is inevitable.

Therefore, there is a need of providing an abnormal battery detecting system and an abnormal battery detecting method for an electric vehicle in order to reduce the spontaneous combustion and increase the safety.

SUMMARY OF THE INVENTION

The present invention provides an abnormal battery detecting system and an abnormal battery detecting method for an electric vehicle in order to reduce the spontaneous combustion of the battery module, increase the safety of the passengers and reducing the cost of the battery module.

In accordance with an aspect of the present invention, there is provided an abnormal battery detecting system for an electric vehicle. The abnormal battery detecting system includes a power supply unit, a displaying unit, a battery module, a safety protection unit, a detecting unit, and a controlling unit. The displaying unit is connected with the power supply unit. The battery module is used as a main power source of the electric vehicle. The safety protection unit is connected with the battery module and the power supply unit. The detecting unit is connected with the battery module and the power supply unit for detecting the battery module. If the battery module is abnormal, the detecting unit generates at least one feedback signal. The controlling unit is connected with the detecting unit, the power supply unit, the displaying unit and the safety protection unit for receiving the at least one feedback signal. According to a result of comparing the at least one feedback signal with at least one preset default value, the controlling unit generates an abnormal level signal to the displaying unit and the safety protection unit. The safety protection unit is selectively enabled to control an operation of the battery module according to the abnormal level signal. Moreover, a warning message is shown on the displaying unit according to the abnormal level signal.

In accordance with another aspect of the present invention, there is provided an abnormal battery detecting method for an electric vehicle. The electric vehicle includes a battery module, a displaying unit and a safety protection unit. The abnormal battery detecting method at least includes the following steps. In a step (a), the battery module is detected. If the battery module is abnormal, at least one feedback signal is generated. In a step (b), an abnormal level signal is generated according to a result of comparing the at least one feedback signal with at least one preset default value. In a step (c), a warning message is shown on the displaying unit according to the abnormal level signal. In a step (d), the safety protection unit is selectively enabled to control an operation of the battery module according to the abnormal level signal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
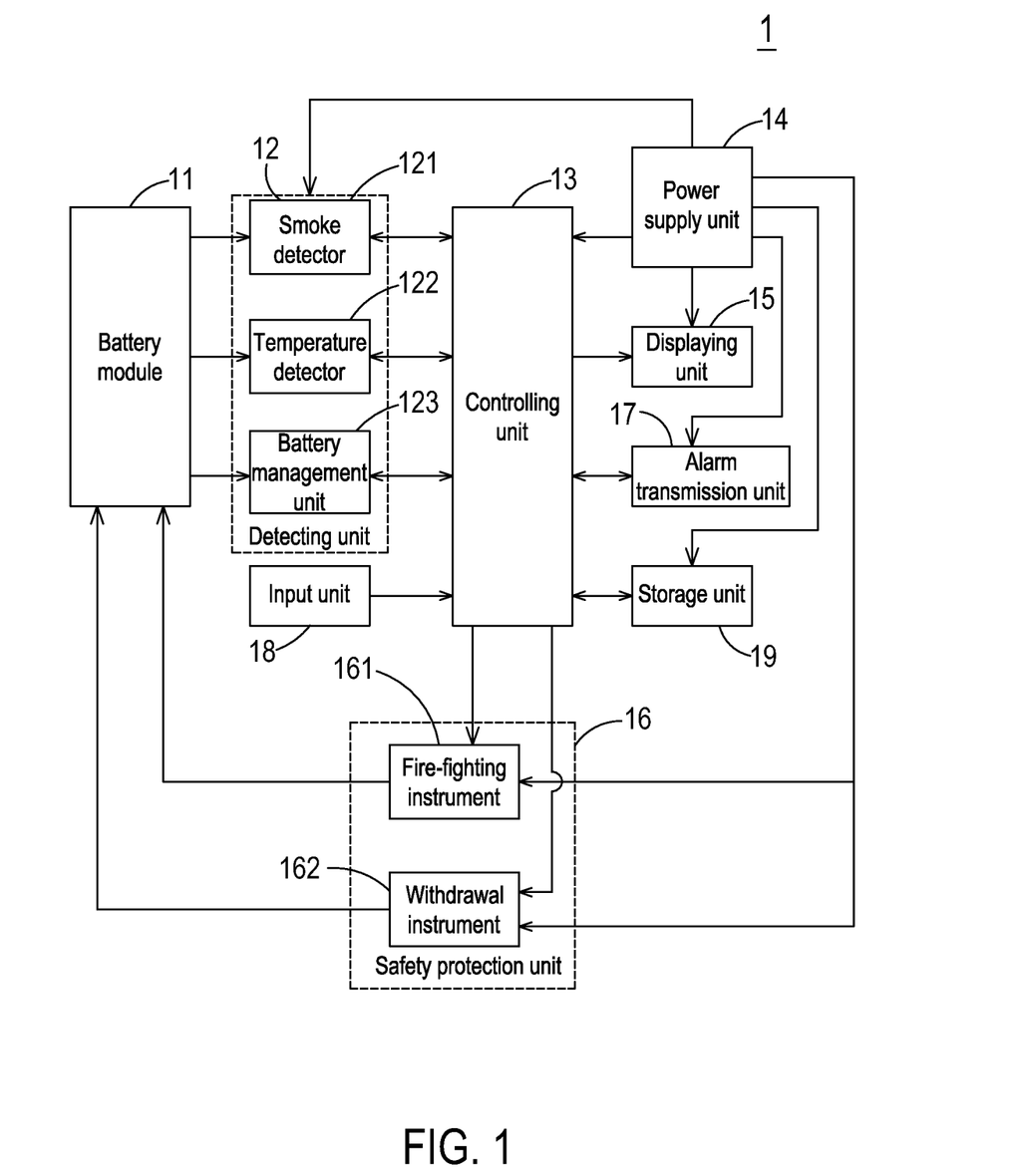
FIG. 1 is a schematic circuit block diagram illustrating an abnormal battery detecting system according to an embodiment of the present invention.

FIG. 1 is a schematic circuit block diagram illustrating an abnormal battery detecting system according to an embodiment of the present invention. The abnormal battery detecting system 1 is applied to an electric vehicle. As shown in FIG. 1, the abnormal battery detecting system 1 comprises a battery module 11, a detecting unit 12, a controlling unit 13, a power supply unit 14, a displaying unit 15, a safety protection unit 16, an alarm transmission unit 17, an input unit 18, and a storage unit 19. The battery module 11 is a removable battery module and installed in a battery box (not shown). The battery module 11 is used as a main power source of the electric vehicle. The power supply unit 14 is an independent power source. For example, the power supply unit 14 is a 12V power source, a 24V power source or a backup power source (e.g. a lead-acid battery). The power supply unit 14 is connected with the detecting unit 12, the controlling unit 13, the displaying unit 15 and the safety protection unit 16. The power supply unit 14 is used for powering the detecting unit 12, the controlling unit 13, the displaying unit 15 and the safety protection unit 16. Consequently, in case that the battery module 11 is abnormal, the abnormal battery detecting system 1 can be normally operated by acquiring power from the power supply unit 14.

The displaying unit 15 is connected with the power supply unit 14 and the controlling unit 13. In case that the battery module 11 is abnormal, the control unit 13 issues an abnormal level signal. In response to the abnormal level signal, a warning message is shown on the displaying unit 15 to notify the driver of the electric vehicle and instruct the driver how to take the emergency measure. The user may input at least one preset default value through the input unit 18 and store the at least one preset default value into the storage unit 19. For example, the at least one preset default value includes a default working temperature value or a default working current value of the battery module 11, a default smoke concentration value of the battery box and a default inner temperature value of the battery box. The alarm transmission unit 17 is connected with the controlling unit 13 and the power supply unit 14. If the controlling unit 13 detects that the battery module 11 is abnormal, the controlling unit 13 issues the abnormal level signal to an electric vehicle management center in a wireless transmission manner.

Please refer to FIG. 1 again. The safety protection unit 16 is connected with the battery module 11 and the power supply unit 14. The safety protection unit 16 comprises a fire-fighting instrument 161 and a withdrawal instrument 162. The fire-fighting instrument 161 is disposed within the battery box, and connected with the power supply unit 14 and the controlling unit 13. The withdrawal instrument 162 is connected with the power supply unit 14 and the controlling unit 13.

The detecting unit 12 is connected with the battery module 11 and the power supply unit 14 for detecting the battery module 11. In case that the battery module 11 is abnormal, the detecting unit 12 issues at least one feedback signals. In this embodiment, the detecting unit 12 comprises a smoke detector 121, a temperature detector 122 and a battery management unit 123. The battery management unit 123 is connected with the battery module 11 and the controlling unit 13 for detecting the working temperature or the working current of the battery module 11. If the battery management unit 123 detects that the working temperature or the working current of the battery module 11 is abnormal, the battery management unit 123 issues the corresponding feedback signal to the controlling unit 13. For example, if the detecting circuit of the detects that the working temperature of the battery module 11 reaches 90° C., the battery management unit 123 issues the feedback signal corresponding to the abnormal condition to the controlling unit 13.

The smoke detector 121 is connected with the battery module 11, the power supply unit 14 and the controlling unit 13 for detecting a smoke concentration within the battery box where the battery module 11 is installed. If the smoke detector 121 detects that there is smoke in the battery box, the smoke detector 121 issues the feedback signal corresponding to the abnormal condition to the controlling unit 13. An example of the temperature detector 122 includes but is not limited to an infrared sensor. The temperature detector 122 is also connected with the battery module 11, the power supply unit 14 and the controlling unit 13 for detecting the inner temperature of the battery box. If the temperature detector 122 detects that the inner temperature of the battery box is abnormal, the temperature detector 122 issues the feedback signal corresponding to the abnormal condition to the controlling unit 13. For example, if the temperature detector 122 detects that the inner temperature of the battery box is higher than 85° C. for at least 5 seconds, the temperature detector 122 issues the feedback signal corresponding to the abnormal condition to the controlling unit 13.

Please refer to FIG. 1 again. The controlling unit 13 is connected with the detecting unit 12, the power supply unit 14, the displaying unit 15 and the safety protection unit 16. The controlling unit 13 may receive the at least one feedback signal from the smoke detector 121, the temperature detector 122 and the battery management unit 123 of the detecting unit 12 and compare the at least one feedback signal with the at least one preset default value. According to the comparing result, the controlling unit 13 generates the corresponding abnormal level signal. In particular, according to the number of the at least one feedback signal and the result of comparing the at least one feedback signal with the corresponding preset default value, the controlling unit 13 may realize a level of an alert event of the battery module 11. Subsequently, the abnormal level signal is transmitted from the controlling unit 13 to the displaying unit 15, the safety protection unit 16 and the alarm transmission unit 17. According to the abnormal level signal, the safety protection unit 16 may control the operation of the battery module 11. According to the abnormal level signal, a warning message is shown on the displaying unit 15 to notify the driver of the electric vehicle and instruct the driver how to take the emergency measure. Moreover, the abnormal level signal is transmitted from the alarm transmission unit 17 to the electric vehicle management center in a wireless transmission manner in order to notify the electric vehicle management center that the abnormal condition of the electric vehicle occurs. Under this circumstance, the maintenance worker may take the emergency measure.

In the abnormal battery detecting system 1 of the present invention, the alert events are classified into a first level alert event, a second level alert event and a third level alert event. It is noted that the way of classifying the alert events may be varied according to the practical requirements.

In a first situation, the feedback signals from the smoke detector 121, the temperature detector 122 and the battery management unit 123 are received. After the feedback signal from the smoke detector 121 is received by the controlling unit 13, the controlling unit 13 may compare the feedback signal from the smoke detector 121 with the default smoke concentration which is stored in the storage unit 19. After the feedback signal from the temperature detector 122 is received by the controlling unit 13, the controlling unit 13 may compare the feedback signal from the temperature detector 122 with the default inner temperature value of the battery box which is stored in the storage unit 19. After the feedback signal from the battery management unit 123 is received by the controlling unit 13, the controlling unit 13 may compare the feedback signal from the battery management unit 123 with the default working temperature value or the default working current value of the battery module 11 which is stored in the storage unit 19. If the comparing result indicates that there is smoke in the battery box, the inner temperature of the battery box exceeds the default inner temperature value and the working temperature or the working current of the battery module 11 exceeds the default working temperature value or the default working current value, the controlling unit 13 judges that the first level alert event occurs. That is, the battery module 11 is subjected to spontaneous combustion. Under this circumstance, the controlling unit 13 may enable the fire-fighting instrument 161 of the safety protection unit 16 to extinguish the battery module 11 and enable the withdrawal instrument 162 of the safety protection unit 16 to withdraw a part of the battery module 11 from the battery box. Consequently, the battery module 11 is electrically disconnected from the battery box. Meanwhile, according to the abnormal level signal corresponding to the first level alert event, a warning message is shown on the displaying unit 15 to notify the driver of the electric vehicle and instruct the driver how to take the emergency measure. Moreover, the abnormal level signal is transmitted from the alarm transmission unit 17 to the electric vehicle management center in a wireless transmission manner in order to notify the electric vehicle management center that the first level alert event of the electric vehicle occurs.

In a second situation, the feedback signals from the smoke detector 121 and the battery management unit 123 are received. After the feedback signal from the smoke detector 121 is received by the controlling unit 13, the controlling unit 13 may compare the feedback signal from the smoke detector 121 with the default smoke concentration which is stored in the storage unit 19. After the feedback signal from the battery management unit 123 is received by the controlling unit 13, the controlling unit 13 may compare the feedback signal from the battery management unit 123 with the default working temperature value or the default working current value of the battery module 11 which is stored in the storage unit 19. If the comparing result indicates that there is smoke in the battery box and the working temperature or the working current of the battery module 11 exceeds the default working temperature value or the default working current value, the controlling unit 13 judges that the second level alert event occurs. Meanwhile, according to the abnormal level signal corresponding to the second level alert event, a warning message is shown on the displaying unit 15 to notify the driver of the electric vehicle and instruct the driver how to take the emergency measure. For example, the user may manually open the battery box to check the battery module 11. According to the checking result, the user may determine whether the fire-fighting instrument 161 and the withdrawal instrument 162 are enabled. Moreover, the abnormal level signal is transmitted from the alarm transmission unit 17 to the electric vehicle management center in a wireless transmission manner in order to notify the electric vehicle management center that the second level alert event of the electric vehicle occurs.

In a third situation, only the feedback signal from the battery management unit 123 is received. After the feedback signal from the battery management unit 123 is received by the controlling unit 13, the controlling unit 13 may compare the feedback signal from the battery management unit 123 with the default working temperature value or the default working current value of the battery module 11 which is stored in the storage unit 19. If the comparing result indicates that the working temperature or the working current of the battery module 11 exceeds the default working temperature value or the default working current value, the controlling unit 13 judges that the third level alert event occurs. Meanwhile, according to the abnormal level signal corresponding to the third level alert event, a warning message is shown on the displaying unit 15 to notify the driver of the electric vehicle and instruct the driver how to take the emergency measure. For example, the user may manually open the battery box to check the battery module 11. Moreover, the abnormal level signal is transmitted from the alarm transmission unit 17 to the electric vehicle management center in a wireless transmission manner in order to notify the electric vehicle management center that the third level alert event of the electric vehicle occurs.

Figure 2A:
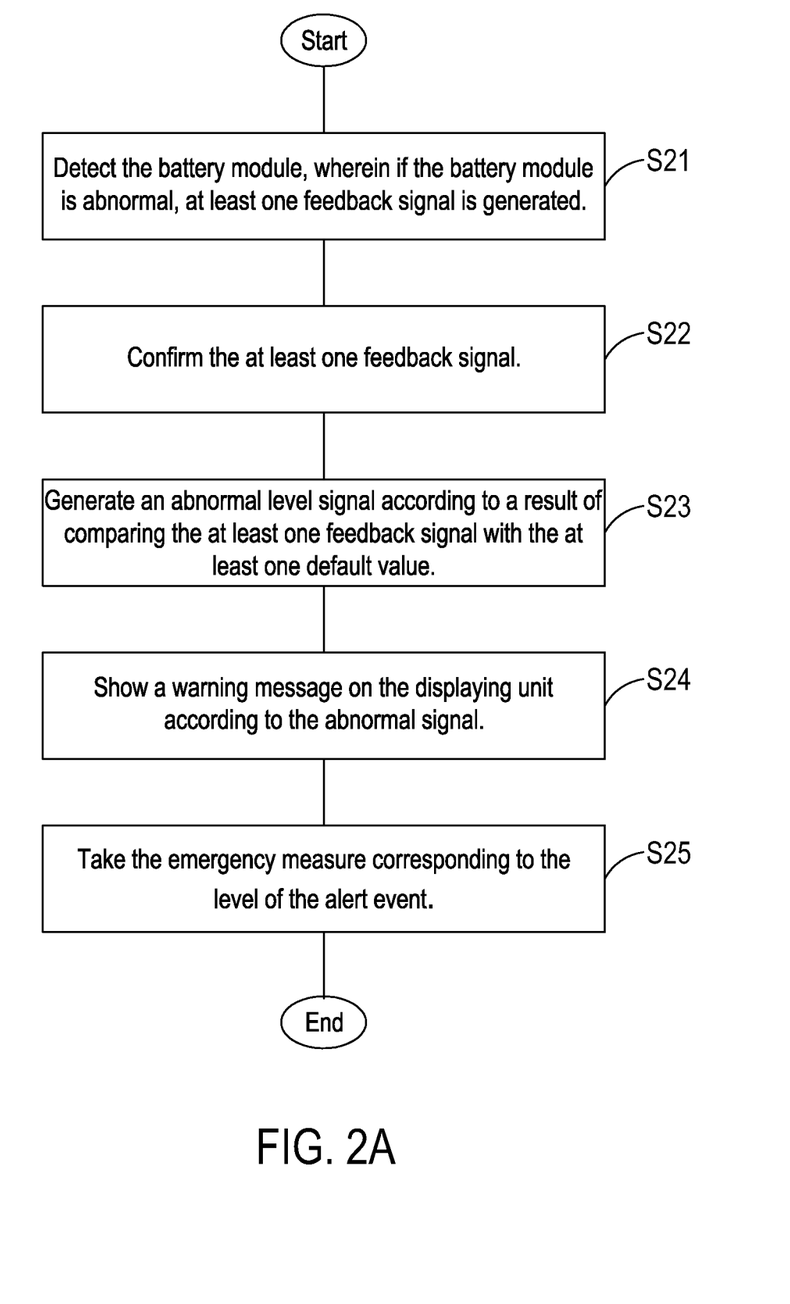
FIG. 2A is a flowchart illustrating an abnormal battery detecting method according to an embodiment of the present invention.

FIG. 2A schematically a flowchart illustrating an abnormal battery detecting method according to an embodiment of the present invention. Please refer to FIGS. 1 and 2A. The abnormal battery detecting method comprises the following steps. Firstly, a step S21 is performed to judge whether the battery module 11 is abnormal. If the battery module 11 is abnormal, at least one feedback signal is generated. That is, the battery management unit 123 detects the working temperature or the working current of the battery module 11. If the battery management unit 123 detects that the working temperature or the working current of the battery module 11 is abnormal, the battery management unit 123 issues the corresponding feedback signal to the controlling unit 13. For example, if the detecting circuit of the detects that the working temperature of the battery module 11 reaches 90° C., the battery management unit 123 issues the feedback signal corresponding to the abnormal condition to the controlling unit 13. Moreover, the smoke detector 121 detects the smoke concentration within the battery box. If the smoke detector 121 detects the presence of smoke in the battery box, the smoke detector 121 issues the feedback signal corresponding to the abnormal condition to the controlling unit 13. Moreover, the temperature detector 122 detects the inner temperature of the battery box. If the temperature detector 122 detects that the inner temperature of the battery box is abnormal, the temperature detector 122 issues the feedback signal corresponding to the abnormal condition to the controlling unit 13. For example, if the temperature detector 122 detects that the inner temperature of the battery box is higher than 85° C. for at least 5 seconds, the temperature detector 122 issues the feedback signal corresponding to the abnormal condition to the controlling unit 13.

Then, in a step S22, the controlling unit 13 is in communication with the smoke detector 121, the temperature detector 122 and the battery management unit 123 again, and confirms whether the at least feedback signal is received. For example, if the feedback signals from the smoke detector 121, the temperature detector 122 and the battery management unit 123 are received by the controlling unit 13 in the step S21 and the identical feedback signals from the smoke detector 121, the temperature detector 122 and the battery management unit 123 are received again by the controlling unit 13 in the step S22, the controlling unit 13 confirms that three feedback signals are received. Whereas, if the feedback signals from the smoke detector 121 and the battery management unit 123 are received by the controlling unit 13 in the step S21 and the identical feedback signals from the smoke detector 121 and the battery management unit 123 are received again by the controlling unit 13 (i.e. the feedback signal from the temperature detector 122 is not received by the controlling unit 13) in the step S22, the controlling unit 13 confirms that two feedback signals are received. Whereas, if only the feedback signal from the battery management unit 123 is received by the controlling unit 13 in the step S21 and the identical feedback signal from the battery management unit 123 is received again by the controlling unit 13 (i.e. the feedback signals from the smoke detector 121 and the temperature detector 122 are not received by the controlling unit 13) in the step S22, the controlling unit 13 confirms that one feedback signal is received.

After the step S22, the controlling unit 13 compares the received feedback signal (or signals) with the corresponding preset default value (or values), and generates a corresponding abnormal level signal according to the comparing result (Step S23).

In a first situation, the feedback signals from the smoke detector 121, the temperature detector 122 and the battery management unit 123 are received. The controlling unit 13 may compare the feedback signal from the smoke detector 121 with the default smoke concentration which is stored in the storage unit 19, compare the feedback signal from the temperature detector 122 with the default inner temperature value of the battery box which is stored in the storage unit 19, and compare the feedback signal from the battery management unit 123 with the default working temperature value or the default working current value of the battery module 11 which is stored in the storage unit 19. If the comparing result indicates that there is smoke in the battery box, the inner temperature of the battery box exceeds the default inner temperature value and the working temperature or the working current of the battery module 11 exceeds the default working temperature value or the default working current value, the controlling unit 13 judges that the first level alert event occurs.

In a second situation, the feedback signals from the smoke detector 121 and the battery management unit 123 are received. The controlling unit 13 may compare the feedback signal from the smoke detector 121 with the default smoke concentration which is stored in the storage unit 19 and compare the feedback signal from the battery management unit 123 with the default working temperature value or the default working current value of the battery module 11 which is stored in the storage unit 19. If the comparing result indicates that there is smoke in the battery box and the working temperature or the working current of the battery module 11 exceeds the default working temperature value or the default working current value, the controlling unit 13 judges that the second level alert event occurs.

In a third situation, only the feedback signal from the battery management unit 123 is received. The controlling unit 13 may compare the feedback signal from the battery management unit 123 with the default working temperature value or the default working current value of the battery module 11 which is stored in the storage unit 19. If the comparing result indicates that the working temperature or the working current of the battery module 11 exceeds the default working temperature value or the default working current value, the controlling unit 13 judges that the third level alert event occurs.

After the level of the alert event of the battery module 11 is realized, under control of the controlling unit 13, a warning message is shown on the displaying unit 15 to notify the driver of the electric vehicle and instruct the driver how to take the emergency measure. For example, the warning message may instruct the driver to stop the electric vehicle on the roadside or at a safe location (Step S24). Subsequently, according to the level of the alert event judged by the controlling unit 13, the corresponding emergency measure is taken (Step S25).

In the abnormal battery detecting system 1 of the present invention, the abnormal conditions are classified into the first level alert event, the second level alert event and the third abnormal condition. Hereinafter, the processes of taking the emergency measures in different abnormal conditions will be illustrated with reference to FIGS. 2B, 2C and 2D.

Figure 2B:
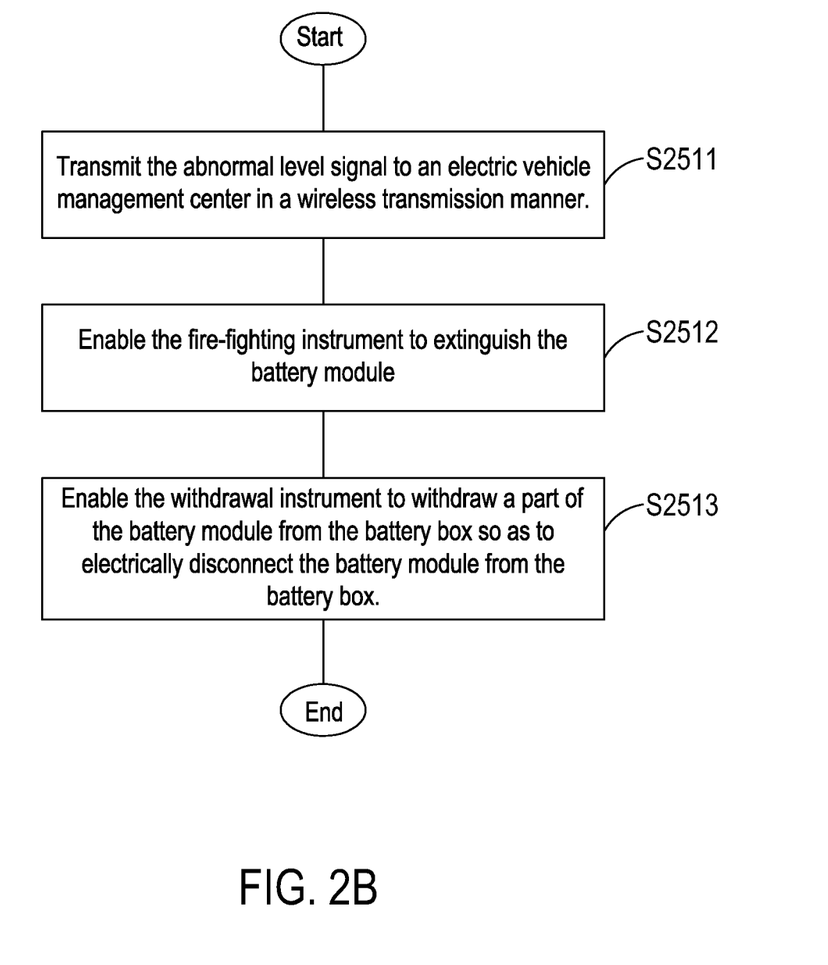
FIG. 2B is a flowchart illustrating a process of taking the emergency measure in the first level alert event of the battery module of FIG. 1.

FIG. 2B is a flowchart illustrating a process of taking the emergency measure in the first level alert event of the battery module of FIG. 1. In case that the first level alert event of the battery module 11 occurs, the battery module 11 is subjected to spontaneous combustion. Under control of the controlling unit 13, the abnormal level signal corresponding to the first level alert event is automatically transmitted from the alarm transmission unit 17 to the electric vehicle management center in a wireless transmission manner (Step S2511). Consequently, the electric vehicle management center may appoint the maintenance worker to repair and process the battery module personally. Then, the controlling unit 13 enables the fire-fighting instrument 161 of the safety protection unit 16 to extinguish the battery module 11 (Step S2512), and enables the withdrawal instrument 162 of the safety protection unit 16 to withdraw a part of the battery module 11 from the battery box so as to electrically disconnect the battery module 11 from the battery box (Step S2513).

Moreover, in case that the first level alert event occurs, the controlling unit 13 may count down time in seconds (count down time in 5 seconds) to display the remaining time periods of disabling the battery module 11, enabling the fire-fighting instrument 161 and enabling the withdrawal instrument 162. Consequently, the driver may realize the subsequent conditions. If the battery module 11 is disabled by the controlling unit 13, the driver fails to stop the electric vehicle immediately. Since the subsequent conditions are realized by the user, the driver may stop the electric vehicle by using the residual speed of the electric vehicle or utilize the backup power source system to power the engine system of the electric vehicle.

Figure 2C:
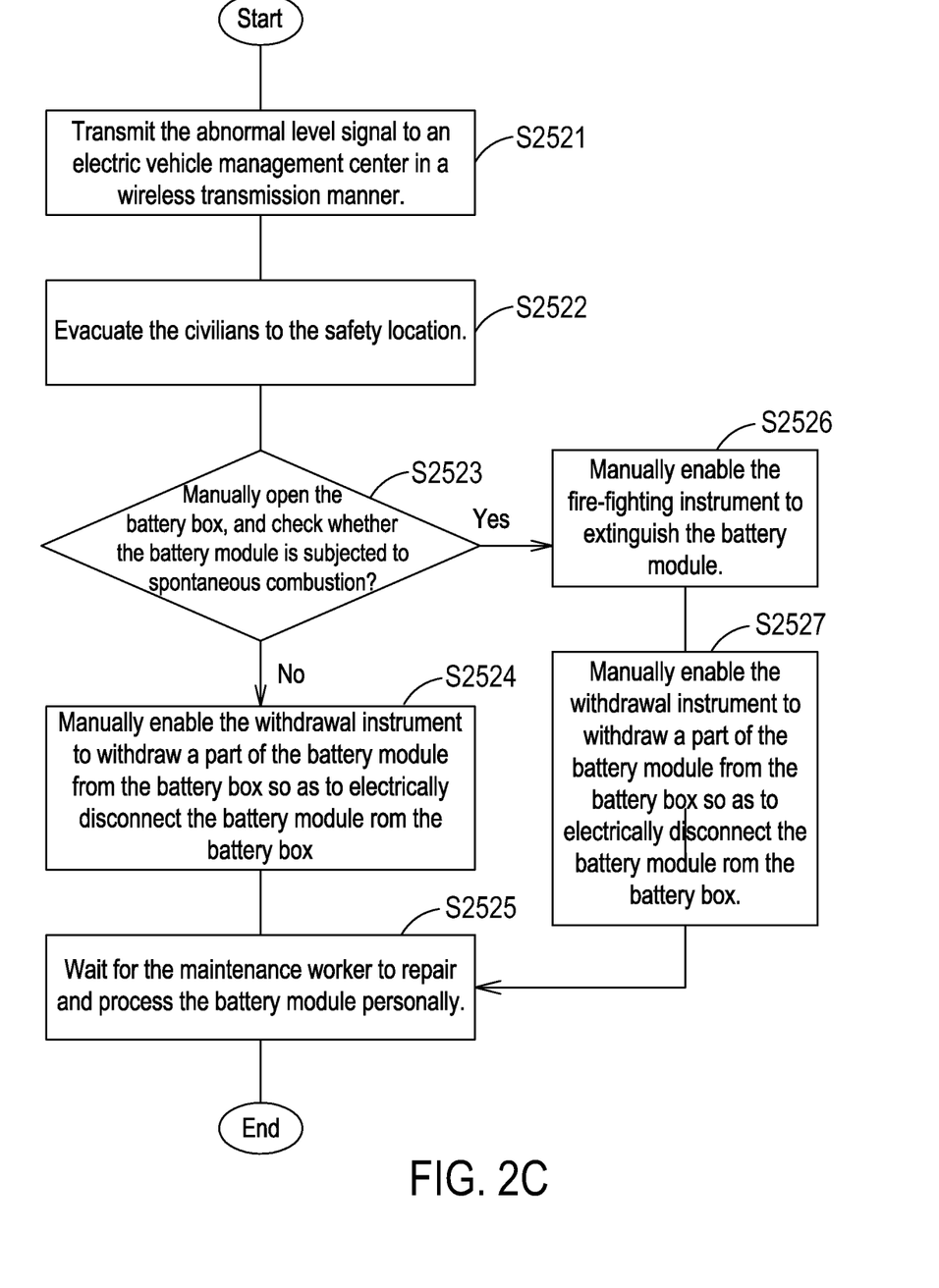
FIG. 2C is a flowchart illustrating a process of taking the emergency measure in the second level alert event of the battery module of FIG. 1.

FIG. 2C is a flowchart illustrating a process of taking the emergency measure in the second level alert event of the battery module of FIG. 1. In case that the second level alert event of the battery module 11 occurs, under control of the controlling unit 13, the abnormal level signal corresponding to the second level alert event is automatically transmitted from the alarm transmission unit 17 to the electric vehicle management center in a wireless transmission manner (Step S2521). Consequently, the electric vehicle management center may appoint the maintenance worker to repair and process the battery module personally. Then, according to the emergency measure shown on the displaying unit 15, the civilians may be evacuated to the safety location (Step S2522). The user may manually open the battery box to check whether the battery module 11 is subjected to spontaneous combustion (Step S2523). If the battery module 11 is not subjected to spontaneous combustion, it means that the battery module 11 may have malfunction. Meanwhile, the driver may manually enable the withdrawal instrument 162 to withdraw a part of the battery module 11 from the battery box so as to electrically disconnect the battery module 11 from the battery box (Step S2524). For example, after the withdrawal instrument 162 is enabled, one fourth of the battery module 11 is withdrawn from the battery box. Under this circumstance, the electrical contacts of the battery module 11 and the corresponding electrical contacts of the electric vehicle are separated from each other, and thus the electrical connection between the battery module 11 and battery box is interrupted. Then, the driver may wait for the maintenance worker to repair and process the battery module personally (Step S2525).

On the other hand, if the battery module 11 is subjected to spontaneous combustion, the driver may manually enable the fire-fighting instrument 161 of the safety protection unit 16 to extinguish the battery module 11 (Step S2526), and then the driver may manually enable the withdrawal instrument 162 to withdraw a part of the battery module 11 from the battery box so as to electrically disconnect the battery module 11 from the battery box (Step S2527). Then, the driver may wait for the maintenance worker to repair and process the battery module personally (Step S2525).

Figure 2D:
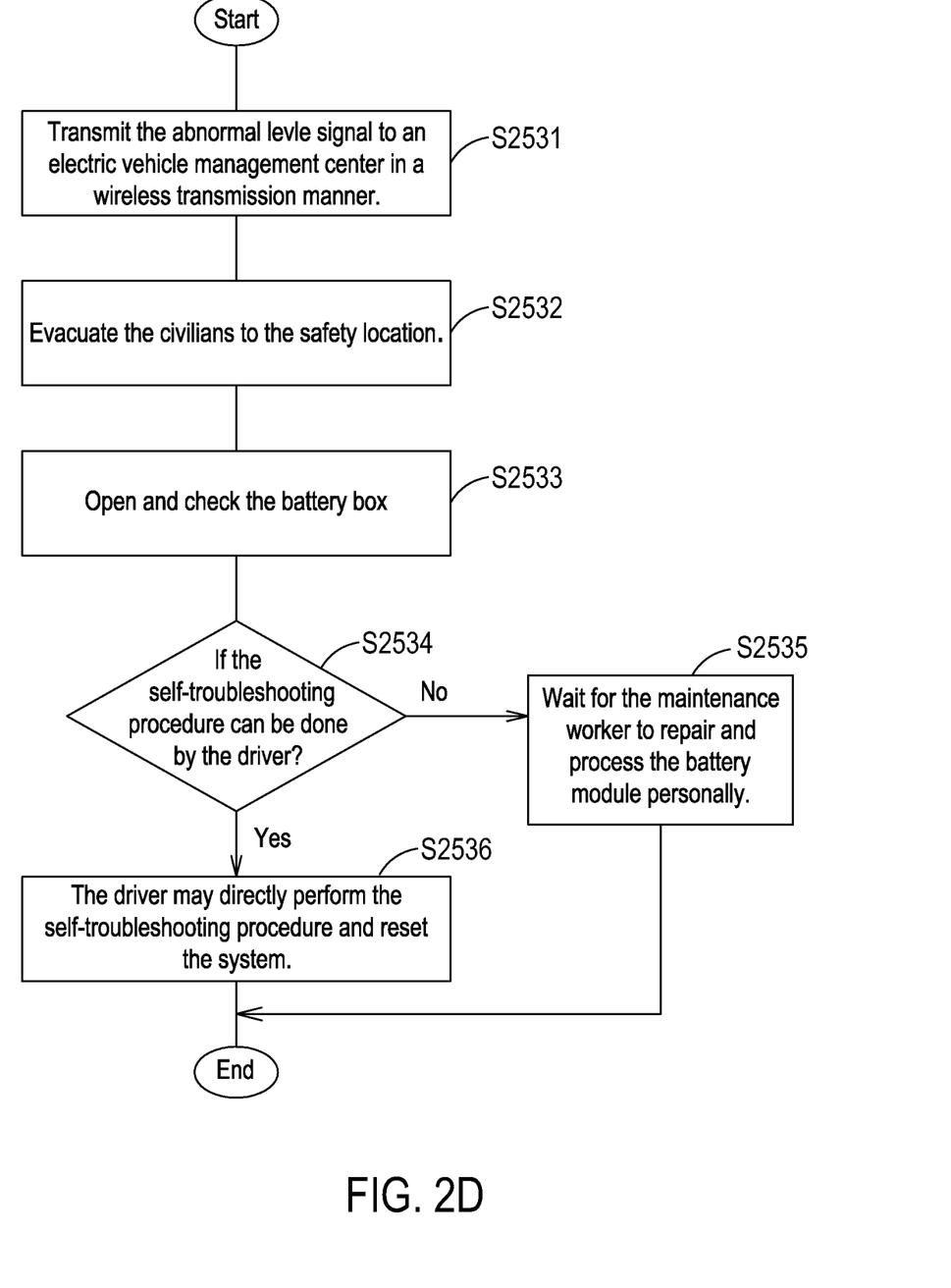
FIG. 2D is a flowchart illustrating a process of taking the emergency measure in the third level alert event of the battery module of FIG. 1.

FIG. 2D is a flowchart illustrating a process of taking the emergency measure in the third level alert event of the battery module of FIG. 1. In case that the third level alert event of the battery module 11 occurs, under control of the controlling unit 13, the abnormal level signal corresponding to the third level alert event is automatically transmitted from the alarm transmission unit 17 to the electric vehicle management center in a wireless transmission manner (Step S2531). Consequently, the electric vehicle management center may appoint the maintenance worker to repair and process the battery module personally. Then, according to the emergency measure shown on the displaying unit 15, the civilians may be evacuated to the safety location (Step S2532). The user may manually open the battery box to check the battery module 11 (Step S2533). Then, the driver judges whether the self-troubleshooting procedure can be done (Step S2534). If the self-troubleshooting procedure fails to be done by the driver, the driver may wait for the maintenance worker to repair and process the battery module personally (Step S2535). On the other hand, if the self-troubleshooting procedure can be done by the driver, the driver may directly perform the self-troubleshooting procedure and reset the system (Step S2536). Then, the electric vehicle may be driven to the maintenance factory for repair and further check.

In accordance with the abnormal battery detecting method of the present invention, the alert events are classified into the first level alert event, the second level alert event and the third level alert event. The measures to be taken in different levels of alert events are used to protect the passengers and reduce the loss. In case that the third level alert event of the battery module 11 occurs, the driver can be early warned that the battery module 11 is abnormal. Consequently, the driver may early take an appropriate measure to reduce the loss. In case that the second level alert event of the battery module 11 occurs, the driver may early realize the abnormal condition or early take an appropriate measure to rescue the battery module 11. Since the cost of the battery module 11 is very high, the loss can be largely reduced. In case that the first level alert event of the battery module 11 occurs, the battery module 11 is possibly subjected to spontaneous combustion. For protecting the passengers and the electric vehicle or the expensive engine system, the driver has no choice but to sacrifice the battery module 11 for avoiding expansion of the injury and loss. The abnormal battery detecting system and the abnormal battery detecting method of the present invention may be applied to the safety system of the electric vehicle. Moreover, the battery module may be a serial battery module or a parallel battery module.

From the above description, the present invention provides an abnormal battery detecting system and an abnormal battery detecting method. If a detecting unit detects that the battery module is abnormal, the detecting module generates at least one feedback signal. According to the result of comparing the at least one feedback signal with at least one preset default value, a controlling unit generates an abnormal level signal to a displaying unit and a safety protection unit. According to the abnormal level signal, the safety protection unit is enabled to take a measure of protecting the battery module and a warning message corresponding to the abnormal level signal is shown on the displaying unit. Consequently, even if the battery module is subjected to spontaneous combustion, the passengers can be effectively protected. Moreover, since the driver can be early warned that the battery module is abnormal, the driver may early take an appropriate measure to reduce the loss. In other words, the cost of the battery module can be reduced. From the above descriptions, the abnormal battery detecting system and the abnormal battery detecting method of the present invention have industrial values.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An abnormal battery detecting system for an electric vehicle, the abnormal battery detecting system comprising:
a power supply unit;
a displaying unit connected with the power supply unit;
a battery module used as a main power source of the electric vehicle;
a safety protection unit connected with the battery module and the power supply unit;
a detecting unit connected with the battery module and the power supply unit for detecting the battery module, wherein if the battery module is abnormal, the detecting unit generates at least one feedback signal; and
a controlling unit connected with the detecting unit, the power supply unit, the displaying unit and the safety protection unit for receiving the at least one feedback signal, wherein according to a result of comparing the at least one feedback signal with at least one preset default value, the controlling unit generates an abnormal signal to the displaying unit and the safety protection unit, wherein the safety protection unit is selectively enabled to control an operation of the battery module according to the abnormal signal, and a warning message is shown on the displaying unit according to the abnormal signal;
wherein the safety protection unit comprises a fire-fighting instrument, wherein the fire-fighting instrument is connected with the power supply unit and the controlling unit and disposed within a battery box, wherein if the battery module is subjected to spontaneous combustion, the fire-fighting instrument is enabled to extinguish the battery module.

2. The abnormal battery detecting system according to claim 1, wherein the battery module is a removable battery module.

3. The abnormal battery detecting system according to claim 1, further comprising an alarm transmission unit, which is connected with the controlling unit and the power supply unit, wherein the abnormal level signal is transmitted from the alarm transmission unit to an electric vehicle management center in a wireless transmission manner.

4. The abnormal battery detecting system according to claim 1, wherein the detecting unit comprises a battery management unit, wherein the battery management unit is connected with the battery module and the controlling unit for detecting a working temperature or a working current of the battery module.

5. The abnormal battery detecting system according to claim 4, wherein the battery module is installed within the battery box, and the detecting unit further comprises a smoke detector, wherein the smoke detector is connected with the battery module and the controlling unit for detecting a smoke concentration within the battery box.

6. The abnormal battery detecting system according to claim 5, wherein the detecting unit further comprises a temperature detector, wherein the temperature detector is connected with the battery module and the controlling unit for detecting an inner temperature of the battery box.

7. The abnormal battery detecting system according to claim 6, further comprising an input unit and a storage unit, wherein the at least one preset default value is inputted through the input unit, and the at least one preset default value is stored in the storage unit.

8. The abnormal battery detecting system according to claim 7, wherein the at least one preset default value includes a default working temperature value or a default working current value of the battery module, a default smoke concentration value of the battery box and a default inner temperature value of the battery box.

9. The abnormal battery detecting system according to claim 1, wherein the safety protection unit further comprises a withdrawal instrument, wherein the withdrawal instrument is connected with the power supply unit and the controlling unit for withdrawing a part of the battery module from the battery box, so that the battery module is electrically disconnected from the battery box.

10. The abnormal battery detecting system according to claim 1, wherein the controlling unit realizes a level of an alert event of the battery module according to a result of comparing the at least one feedback signal with the at least one preset default value and generates an abnormal signal corresponding to the level of the alert event, and the safety protection unit is selectively enabled to control an operation of the battery module according to the abnormal signal corresponding to the level of the alert event of the battery module.

11. An abnormal battery detecting method for an electric vehicle, the electric vehicle comprising a battery module, a displaying unit and a safety protection unit, the abnormal battery detecting method at least comprising steps of:
(a) detecting the battery module, wherein if the battery module is abnormal, at least one feedback signal is generated;
(b) generating an abnormal level signal according to a result of comparing the at least one feedback signal with at least one preset default value;
(c) showing a warning message on the displaying unit according to the abnormal signal; and
(d) selectively enabling the safety protection unit to control an operation of the battery module according to the abnormal signal;
wherein the step (d) further comprises a sub-step (d1) of extinguishing the battery module if the battery module is subjected to spontaneous combustion.

12. The abnormal battery detecting method according to claim 11, wherein the step (a) further comprises a sub-step (a1) of detecting a working temperature or a working current of the battery module.

13. The abnormal battery detecting method according to claim 12, wherein the battery module is installed within a battery box, and the step (a) further comprises a sub-step (a2) of detecting a smoke concentration within the battery box.

14. The abnormal battery detecting method according to claim 13, wherein the step (a) further comprises a sub-step (a3) of detecting an inner temperature of the battery box.

15. The abnormal battery detecting method according to claim 11, wherein the step (c) further comprises a sub-step (c1) of transmitting the abnormal signal to an electric vehicle management center in a wireless transmission manner.

16. The abnormal battery detecting method according to claim 11, wherein the battery module is installed within a battery box, and the step (d) further comprises a sub-step (d2) of withdrawing a part of the battery module from the battery box, so that the battery module is electrically disconnected from the battery box.

17. An abnormal battery detecting system for an electric vehicle, the abnormal battery detecting system comprising:
a power supply unit;
a displaying unit connected with the power supply unit;
a battery module used as a main power source of the electric vehicle;
a safety protection unit connected with the battery module and the power supply unit;
a detecting unit connected with the battery module and the power supply unit for detecting the battery module, wherein if the battery module is abnormal, the detecting unit generates at least one feedback signal; and
a controlling unit connected with the detecting unit, the power supply unit, the displaying unit and the safety protection unit for receiving the at least one feedback signal, wherein according to a result of comparing the at least one feedback signal with at least one preset default value, the controlling unit generates an abnormal signal to the displaying unit and the safety protection unit, wherein the safety protection unit is selectively enabled to control an operation of the battery module according to the abnormal signal, and a warning message is shown on the displaying unit according to the abnormal signal;
wherein the safety protection unit comprises a withdrawal instrument, wherein the withdrawal instrument is connected with the power supply unit and the controlling unit for withdrawing a part of the battery module from a battery box, so that the battery module is electrically disconnected from the battery box;
wherein the safety protection unit comprises a fire-fighting instrument, wherein the fire-fighting instrument is connected with the power supply unit and the controlling unit and disposed within a battery box, wherein if the battery module is subjected to spontaneous combustion, the fire-fighting instrument is enabled to extinguish the battery module.

18. The abnormal battery detecting system according to claim 17, wherein the battery module is a removable battery module.

19. The abnormal battery detecting system according to claim 17, further comprising an alarm transmission unit, which is connected with the controlling unit and the power supply unit, wherein the abnormal signal is transmitted from the alarm transmission unit to an electric vehicle management center in a wireless transmission manner.

20. The abnormal battery detecting system according to claim 17, wherein the detecting unit comprises a battery management unit, wherein the battery management unit is connected with the battery module and the controlling unit for detecting a working temperature or a working current of the battery module.

21. The abnormal battery detecting system according to claim 20, wherein the battery module is installed within the battery box, and the detecting unit further comprises a smoke detector, wherein the smoke detector is connected with the battery module and the controlling unit for detecting a smoke concentration within the battery box.

22. The abnormal battery detecting system according to claim 21, wherein the detecting unit further comprises a temperature detector, wherein the temperature detector is connected with the battery module and the controlling unit for detecting an inner temperature of the battery box.

23. The abnormal battery detecting system according to claim 22, further comprising an input unit and a storage unit, wherein the at least one preset default value is inputted through the input unit, and the at least one preset default value is stored in the storage unit.

24. The abnormal battery detecting system according to claim 23, wherein the at least one preset default value includes a default working temperature value or a default working current value of the battery module, a default smoke concentration value of the battery box and a default inner temperature value of the battery box.

25. An abnormal battery detecting method for an electric vehicle, the electric vehicle comprising a battery module, a displaying unit and a safety protection unit, the abnormal battery detecting method at least comprising steps of:
 (a) detecting the battery module, wherein if the battery module is abnormal, at least one feedback signal is generated;
 (b) generating an abnormal level signal according to a result of comparing the at least one feedback signal with at least one preset default value;
 (c) showing a warning message on the displaying unit according to the abnormal signal; and
 (d) selectively enabling the safety protection unit to control an operation of the battery module according to the abnormal signal;
 wherein the step (d) further comprises a sub-step (d1) of withdrawing the battery module from a battery box, so that the battery module is electrically disconnected from the battery box;
 wherein if the battery module is subjected to spontaneous combustion, the step (d) further comprises a sub-step (d2) of extinguishing the battery module.

26. The abnormal battery detecting method according to claim 25, wherein the step (a) further comprises a sub-step (a1) of detecting a working temperature or a working current of the battery module.

27. The abnormal battery detecting method according to claim 26, wherein the battery module is installed within the battery box, and the step (a) further comprises a sub-step (a2) of detecting a smoke concentration within the battery box.

28. The abnormal battery detecting method according to claim 27, wherein the step (a) further comprises a sub-step (a3) of detecting an inner temperature of the battery box.

29. The abnormal battery detecting method according to claim 25, wherein the step (c) further comprises a sub-step (c1) of transmitting the abnormal signal to an electric vehicle management center in a wireless transmission manner.

* * * * *